US006957735B2

(12) United States Patent
Varone et al.

(10) Patent No.: US 6,957,735 B2
(45) Date of Patent: Oct. 25, 2005

(54) PNEUMATIC SPINNER DRIVE TENSIONING ASSEMBLY

(75) Inventors: Russell Varone, Red Lion, PA (US); Michael Deitz, Manchester, PA (US)

(73) Assignee: Graham Packaging, L.P., York, PA (US)

( * ) Notice: Subject to any disclaimer, the term of this patent is extended or adjusted under 35 U.S.C. 154(b) by 73 days.

(21) Appl. No.: 10/384,740

(22) Filed: Mar. 11, 2003

(65) Prior Publication Data

US 2004/0180744 A1  Sep. 16, 2004

(51) Int. Cl.[7] ............................................. F16H 7/08
(52) U.S. Cl. ..................... 198/813; 474/102; 474/103; 474/104; 198/811; 198/812
(58) Field of Search .................. 474/102, 103, 474/104, 101; 198/813, 812, 810.04, 811

(56) References Cited

U.S. PATENT DOCUMENTS

| | | | |
|---|---|---|---|
| 3,048,048 A * | 8/1962 | Weston ........................ | 474/51 |
| 4,640,406 A | 2/1987 | Willison | |
| 4,927,205 A | 5/1990 | Bowler et al. | |
| 5,261,527 A | 11/1993 | Krismanth et al. | |
| 5,415,274 A | 5/1995 | Kirsmanth et al. | |
| 5,419,427 A | 5/1995 | Wurgler | |
| 5,542,526 A | 8/1996 | Wurgler | |
| 5,555,799 A * | 9/1996 | Amick et al. ............... | 474/272 |
| 5,558,200 A | 9/1996 | Whitby et al. | |
| 5,769,476 A | 6/1998 | Lawn et al. | |
| 5,950,804 A * | 9/1999 | Farkas ..................... | 198/626.1 |
| 6,572,501 B2 * | 6/2003 | Winklhofer ................. | 474/102 |

\* cited by examiner

*Primary Examiner*—David A. Bucci
*Assistant Examiner*—Bradley J. Van Pelt
(74) *Attorney, Agent, or Firm*—Venable LLP; James R. Burdett; Keith G. Haddaway

(57) ABSTRACT

An pneumatic tensioner apparatus is disclosed, the apparatus including: a main drive belt; a chuck assembly, suspended from the main drive belt, having a spinning member and a drive contact portion; a first frictional drive belt in a first track, the first frictional drive belt in contact with the drive contact portion operative to spin the chuck assembly; and a first tension adjusting device having at least one pneumatic tension adjustment member operative to apply pressure to the first frictional drive belt tangentially to the drive contact portion.

17 Claims, 4 Drawing Sheets

PNEUMATIC SPINNER DRIVE TENSIONING ASSEMBLY

BACKGROUND OF THE INVENTION

1. Field of the Invention

The present invention relates generally to a positive apparatus for, and method of, rotating bottle-holding chuck assemblies, particularly during coating application, to ensure correct bottle positioning during bottle finishing operations, for instance during exposure to coating application, to provide for coating application around the entire bottle circumference.

2. Related Art

In the bottle manufacturing industry, bottles move through various manufacturing steps suspended from chuck assemblies which are themselves moved by belt systems. One manufacturing step can include the application of a coating to a bottle. Such coatings can include resins to improve gas impermeability of the bottles, and coating to impart color to the bottle. Coatings can also be referred to generically as "paint." As the bottles are moved through coating application steps, the bottles are spun in order to achieve a uniform application of the coating around the entire bottle. A major defect results when a bottle fails to spin correctly during coating application. A misapplication of coating causes a bottle to be scrapped. Numerous parts of the machine for coating the bottles are also subject to deposits from the coating material and subsequent operational failure.

A linear belt drive, for example, one designed by Feco Engineered Systems, Ltd. of Cleveland, Ohio, U.S.A., uses a series of idler rollers to provide belt-to-chuck contact. The Feco assembly uses a single drive belt mounted on a single side of the chuck assembly with no counterbalancing force. The single-sided application of tensioning force leads to slipping belts, which can cause misalignment. For example, belt slippage can cause misalignment of a bottle with respect to an anticipated position of the bottle for coating application.

Conventional assemblies do not provide positive contact with the chuck assembly throughout the track length. Instead, conventional assemblies provide contact only at a series of tangent points along the track. Lack of continuous contact can cause uneven spinning of the bottles.

Conventional assemblies also do not allow "on the fly" adjustments to the contact tension to compensate for variability in the bottles. Instead, a lengthy adjustment process must be done which is very operator dependent.

What is needed then is an improved assembly that overcomes shortcomings of conventional solutions.

SUMMARY OF THE INVENTION

In an exemplary embodiment of the present invention a pneumatic tensioner apparatus is disclosed. The pneumatic tensioner apparatus comprises: a main drive belt; a chuck assembly, suspended from the main drive belt, having a spinning member and a drive contact portion; a first frictional drive belt in a first track, the first frictional drive belt in contact with the drive contact portion operative to spin the chuck assembly; and a first tension adjusting device having at least one pneumatic tension adjustment member operative to apply pressure to the first frictional drive belt tangentially to the drive contact portion.

In another exemplary embodiment, the present invention can be a method of applying a coating to a container comprising: attaching a container to a chuck having a contact portion and a spinning member; contacting the contact portion with a frictional drive belt; applying pressure to the frictional drive belt with a pneumatic tensioner to increase contact with the contact portion; moving the chuck in a first direction at a first speed; moving the frictional drive belt in at least one of a second direction and a second speed in order to spin the chuck and the container; adjusting the pressure to the frictional drive belt with the pneumatic tensioner; and applying a coating to the spinning container.

In another exemplary embodiment, the present invention can be a pneumatic tensioner apparatus comprising: a main drive belt; a chuck assembly, suspended from the main drive belt, having a spinning member and a drive contact portion; a first frictional drive belt in a first floating track, the first frictional drive belt in contact with the drive contact portion operative to spin the chuck assembly; a first tension adjusting device having at least one pneumatic tension adjustment member operative to apply pressure through the first floating track to the first frictional drive belt tangentially to the drive contact portion; a second frictional drive belt in a second floating track in contact with the drive contact portion and disposed on an opposite side of the chuck assembly to the first frictional drive belt and moving in a direction opposite the first frictional drive belt; and a second tension adjusting device having at least one pneumatic tension adjustment member operative to apply pressure through the second floating track to the second frictional drive belt tangentially to the drive contact portion; wherein the first and second pneumatic tension adjustment members each comprise a flexible elastic tube filled with a compressed substance, and wherein the pressure applied by the tube is adjusted by varying the amount of the compressed substance in the tube.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

In an exemplary embodiment of the present invention, a pneumatic tensioner provides a full length contact path on both sides of a chuck assembly and provides a positive, balanced frictional force to rotate the chuck assembly. The invention can be used for any application where a part suspended from a device having a circular contact portion requires even rotation. Such applications can include, for example, applying a coating or paint to the suspended parts, and drying or curing a suspended part.

Figure 1:
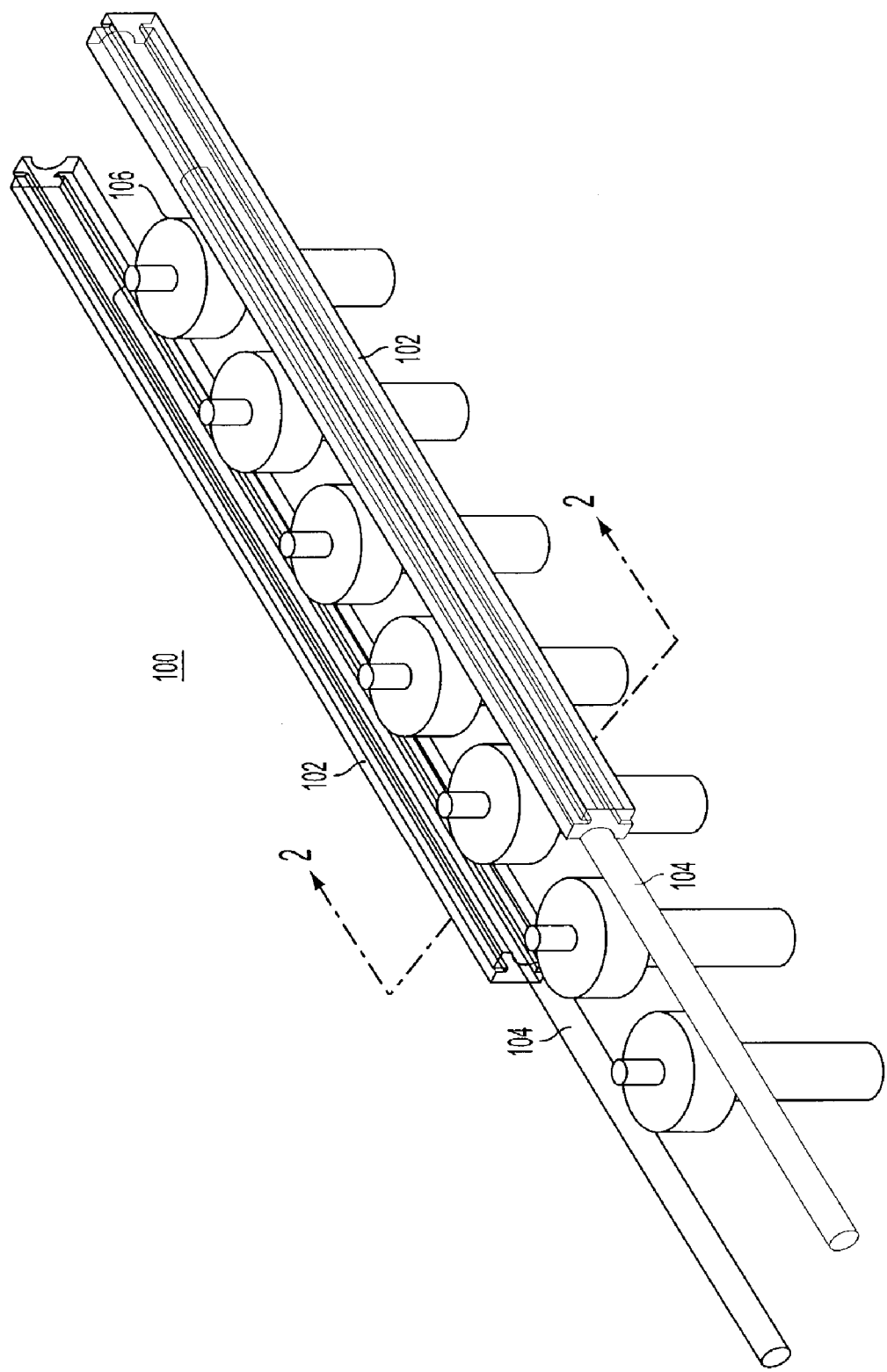
FIG. 1 shows an isometric view of an exemplary embodiment of the present invention.

FIG. 1 shows an isometric view 100 of an exemplary embodiment of a pneumatic tensioner system of the present invention. A pair of tracks 102, each holding one side of a frictional drive belt 104, hold between them a series of chuck assemblies 106. In an exemplary embodiment, tracks 102 are made of a non-stick surface such as, e.g. TEFLON™. Each chuck assembly 106 can hold a suspended bottle (not shown). The frictional drive belt 104, as it moves, imparts a spin to the chuck assemblies 106, and hence to the bottles. The chuck assemblies 106 are coupled, via a spindle shaft, to a third belt (not shown), which imparts an overall forward motion to the line of bottles.

Figure 2:
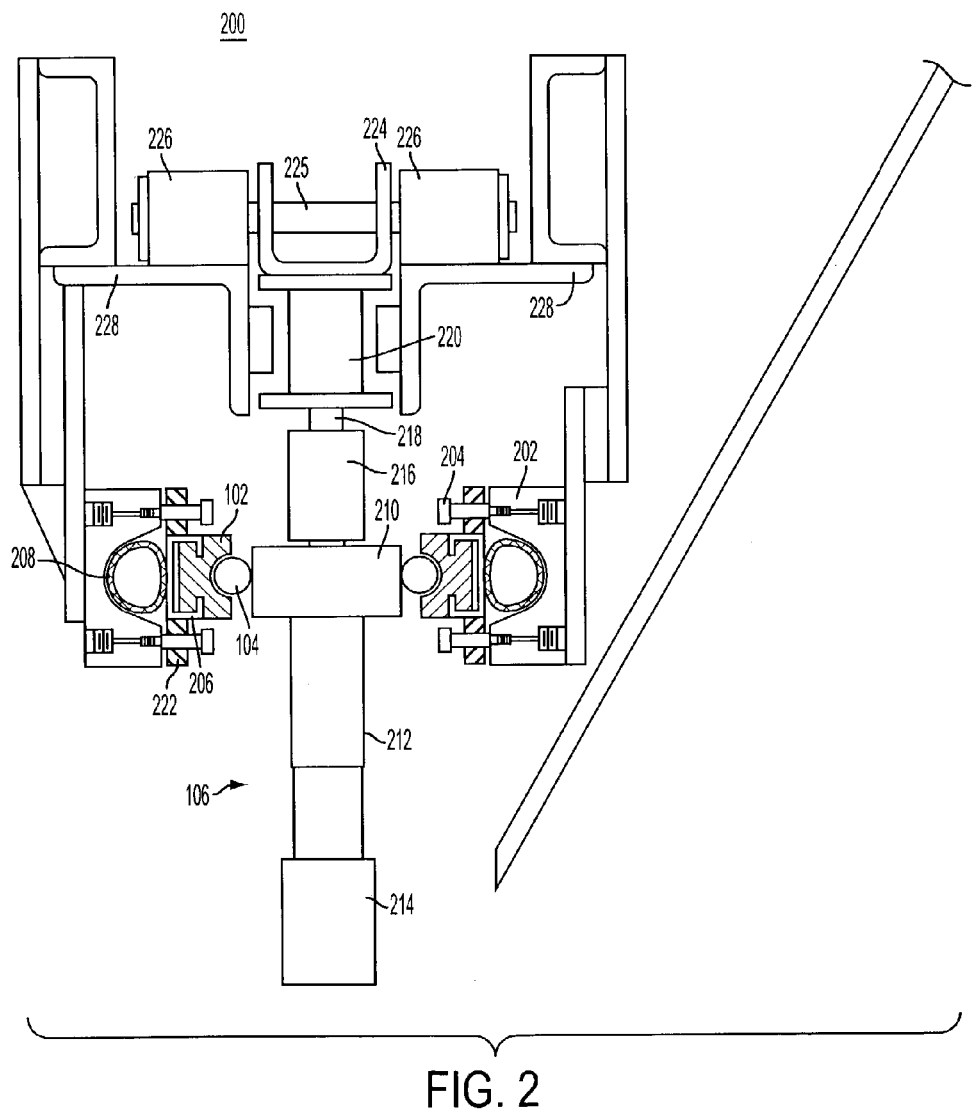
FIG. 2 shows a cross-sectional view along line 1–1 of FIG. 1.

FIG. 2 shows a cross-sectional view 200 of the pneumatic tensioner system of the present invention along line 1–1 of FIG. 1. The track 102 is mounted on a floating bracket 222 via a support track 206, which together form an assembly. The floating bracket 222 rests against a length of PVC tube 208, which can be inflated, for example, by compressed air or some other substance. The PVC tube 208 is housed in a housing 202, to which is coupled the floating bracket 222 via fasteners 204. The PVC tube 208 is flexible and elastically expandable and contractible. The PVC tube 208 presses against the support track 206, floating bracket 222 and track 102 assembly, which in turn presses the frictional drive belt 104 against the chuck assembly 106. Controlling the pressure of the compressed substance in the PVC tube 208 increases or decreases the tangential contact force of the frictional drive belt 104 against the chuck assembly 106. A pump or compressor (not shown) can be used to control the pressure of the compressed substance. Specifically, the frictional drive belt 104 presses against a drive contact portion 210, commonly referred to as a drive lug, which is coupled to a spindle body 212 and a cylindrical locking collar 216 of the chuck assembly 106. A spindle nose 214 of chuck assembly 106 can couple to a bottle to hold the bottle.

The chuck assembly 106 is coupled to a main drive belt 220, e.g. a carrier chain, via the cylindrical locking collar 216 and a carrier pin 218. The main drive belt 220 is the belt that provides the overall forward motion to the line of chuck assemblies. The main drive belt 220 is coupled to a bracket 224. The bracket 224 holds, in openings at each extremity, a shaft 225 to which are coupled two rollers 226. The rollers 226 roll on L-brackets 228 to move the chuck assembly 106 forward.

The speed of the frictional drive belts 104 and the main drive belt 220 can be controlled by a controlled drive mechanism 304 (not shown in FIG. 2) such as, for example, a variable frequency drive motor and gearbox combination. The speed of motion of the frictional drive belt 104 can be, in an exemplary embodiment, operator selectable and programmed to provide a matched speed of rotation for both the main drive belt and the frictional drive belt 104. Speed matching is done by matching the contact speed of the each belt to the surface velocity of the part being rotated, for example, the chuck assembly 206. For example, to set the speed of the counter travel frictional drive belt, the relative velocity of the main drive belt 220 is subtracted from the rotational surface velocity of the chuck assembly 106. To set the speed of the relative travel frictional drive belt, the relative velocity of the main drive belt 220 is doubled and then added to the rotational surface velocity of the chuck assembly 106. The speed of motion of the frictional drive belt 104 can also be offset to compensate for forward relative motion of the main drive belt 220 and chuck assemblies 106 through the coating application area. It is important to set and maintain correct speed settings due to the frictional forces that are created by unbalanced speeds. An imbalance can cause inconsistencies in part rotation speed and increased wear.

In an exemplary embodiment of the present invention, a single side of a frictional drive belt can be used on one side of the contact portion of the chuck assembly. In order to maintain a continuous counter-balancing force, a series of idler rollers may be used on the opposite side of the chuck assembly. Alternatively, a non-pneumatic tensioning belt can be used on the opposite side of the contact portion from the frictional drive belt to provide the counter-balancing force to the frictional drive belt.

The pneumatic tensioner system of the present invention provides several advantages. First, the use of the air-filled PVC tubing 208 allows for remote adjustment of the running tension by changing the amount of the compressed substance, e.g. air, in the tubing. Second, the pneumatic tensioner system uses only four moving parts as opposed to more than fifty for a conventional system, which means less wear and tear on the apparatus and lower maintenance costs. An example of a conventional system is the rotational and retractable container holding device described in U.S. Pat. No. 4,640,406, the contents of which are incorporated herein by reference in their entirety, and available from Feco Engineered Systems, Ltd. of Cleveland, Ohio, U.S.A. Third, the pneumatic tensioner system is more compact and has less exposure to coating contamination than conventional devices, again reducing maintenance costs. Fourth, the pneumatic tensioner system provides for a much more balanced frictional drive force, which provides an extremely low level of belt slippage. Limiting slippage greatly reduces the occurrence of bottle defects due to improper spin, which reduces scrap. Additionally, the pneumatic tensioner system is much less expensive to build than conventional systems, and is particularly well-suited to low speed manufacturing and assembly lines.

Figure 3:
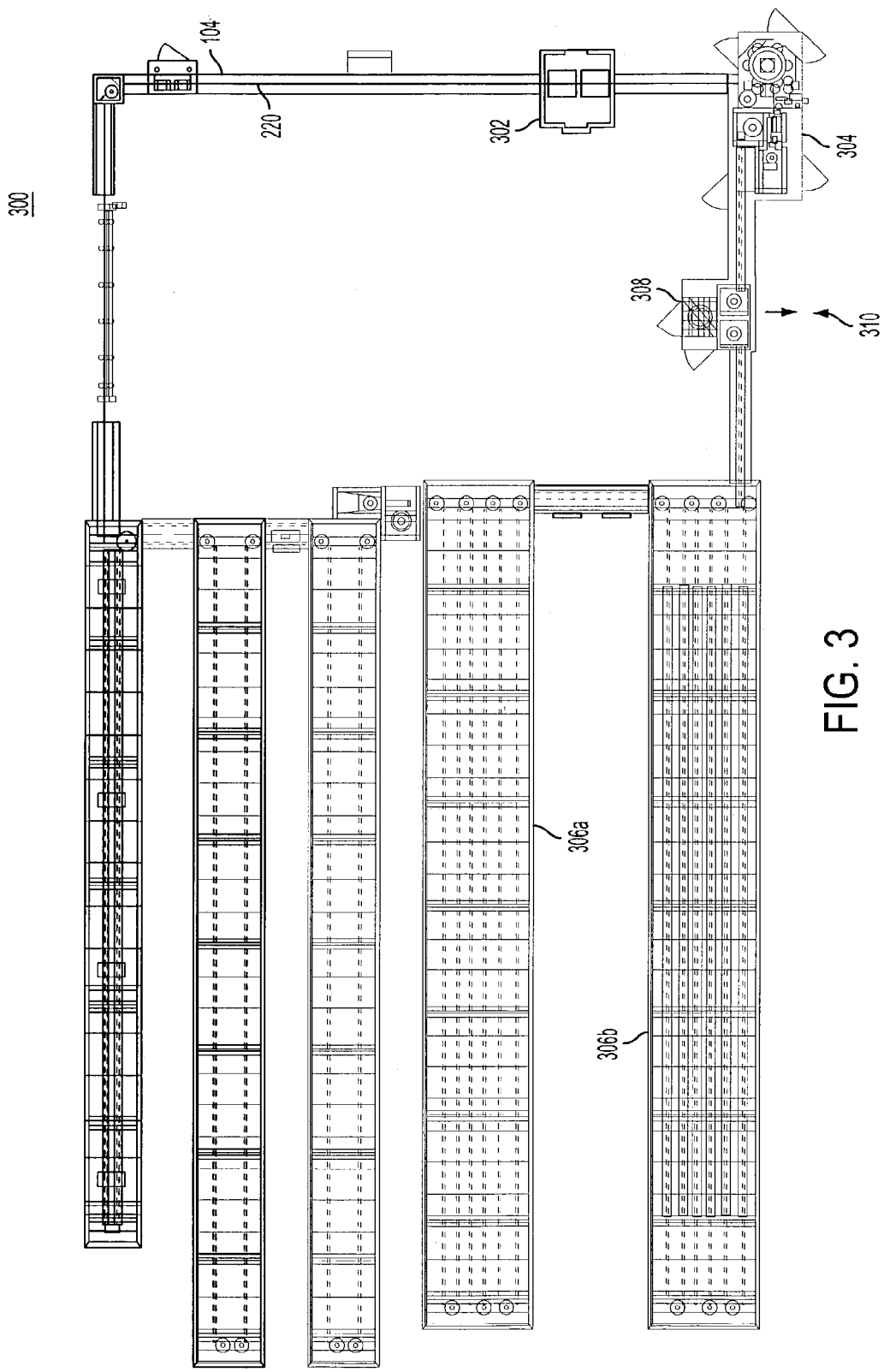
FIG. 3 shows a top view of the system of the present invention.

FIG. 3 shows a top view 300 of an exemplary embodiment of a closed-loop system using the pneumatic tensioner system according to the present invention. The main drive belt 220 is driven by drive 304. An example drive 304 is described in U.S. Pat. No. 5,769,476 to Lawn et al., filed Sep. 16, 1996, entitled "Apparatus and Method for Handling and Processing Articles," the contents of which are incorporated herein by reference in their entirety. As bottles suspended from the main drive belt 220 pass through spray booth 302, the bottles are spun by frictional drive belt 104 while coating is applied. The bottles proceed through ovens 306a and 306b where the coating dries. The dry, coated bottles are then unloaded from the main drive belt 220 at unloader 308 and can be taken away by a take-away conveyor indicated by arrow 310.

Figure 4:
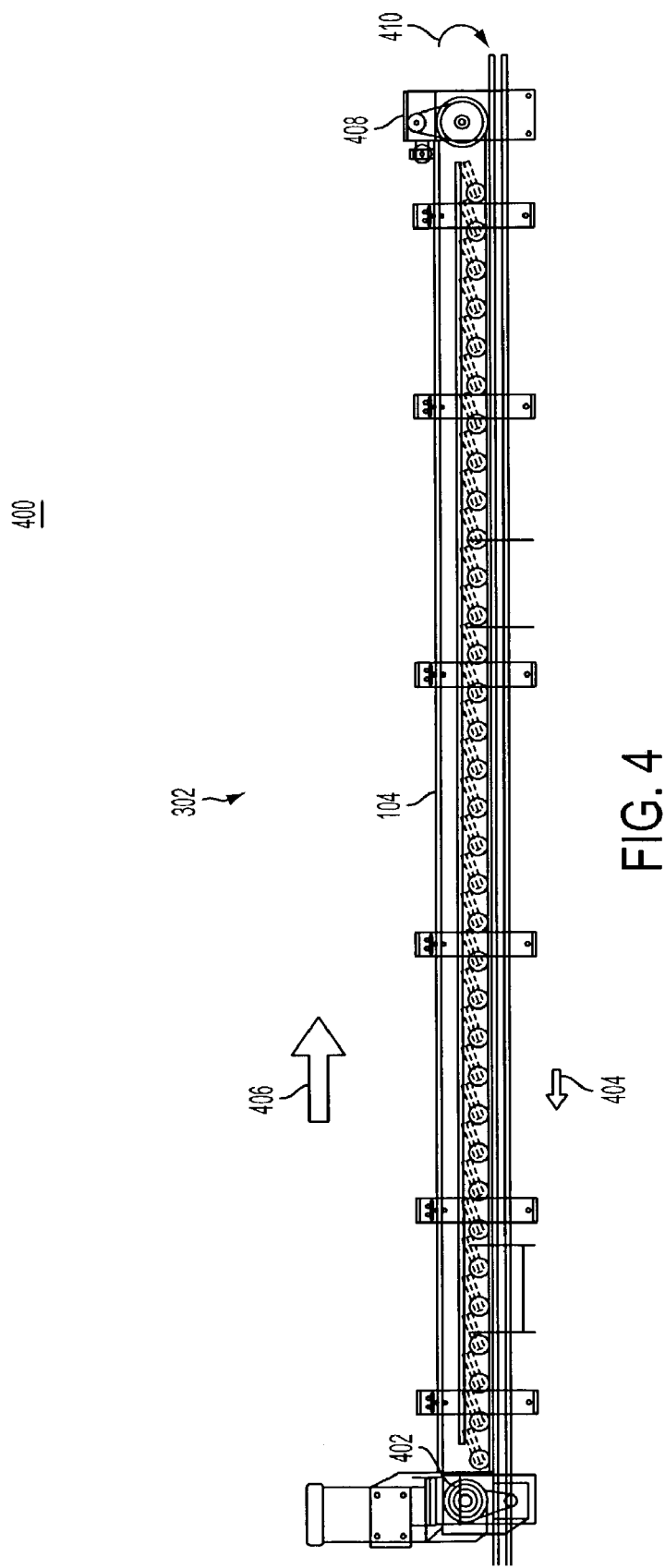
FIG. 4 shows a top view of the system of the present invention inside a spray booth.

FIG. 4 shows a top view 400 of an exemplary embodiment of the pneumatic tensioner system of the present invention inside the spray booth 302. The frictional drive belt 104 is driven by spinner drive 402 in the direction indicated by arrows 404 and directed arc 410. At the end opposite the spinner drive 402, the frictional drive belt turns around the automatic take-up 408 as illustrated by directed arc 410. The main drive belt (not shown) moves in the direction indicated by arrow 406.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. An pneumatic tensioner apparatus, comprising:
a main drive belt;
a chuck assembly, suspended from said main drive belt, having a spinning member and a drive contact portion;
a first frictional drive belt in a first track, said first frictional drive belt in contact with said drive contact portion operative to spin said chuck assembly; and
a first tension adjusting device having at least one pneumatic tension adjustment member operative to apply pressure to said first frictional drive belt tangentially to said drive contact portion.

2. The pneumatic tensioner apparatus of claim 1, further comprising:
a second frictional drive belt in a second track in contact with said drive contact portion and disposed on an opposite side of said chuck assembly to said first frictional drive belt and moving in a direction opposite said first frictional drive belt; and
a second tension adjusting device having at least one pneumatic tension adjustment member operative to apply pressure to said second frictional drive belt tangentially to said drive contact portion.

3. The pneumatic tensioner apparatus of claim 2, wherein said first and second frictional drive belts are the same continuous belt.

4. The pneumatic tensioner apparatus of claim 1, wherein said at least one pneumatic tension adjustment member comprises a flexible elastic tube filled with a compressed substance, and wherein said pressure applied by said tube is adjusted by varying the amount of said compressed substance in said tube.

5. The pneumatic tensioner apparatus of claim 4, wherein said compressed substance is air.

6. The pneumatic tensioner apparatus of claim 4, wherein said tube runs parallel to said first track.

7. The pneumatic tensioner apparatus of claim 1, wherein said main drive belt comprises a carrier chain.

8. The pneumatic tensioner apparatus of claim 1, wherein said first frictional drive belt moves in a direction opposite said main drive belt.

9. The pneumatic tensioner apparatus of claim 1, wherein said first track comprises a floating bracket.

10. The pneumatic tensioner apparatus of claim 1, wherein said first track is coupled to a support track.

11. The pneumatic tensioner apparatus of claim 10, wherein said support track is coupled to a floating bracket.

12. The pneumatic tensioner apparatus of claim 1, wherein said first track is coated with a non-stick surface.

13. An pneumatic tensioner apparatus comprising:
a main drive belt;
a chuck assembly, suspended from said main drive belt, having a spinning member and a drive contact portion;
a first frictional drive belt in a first floating track, said first frictional drive belt in contact with said drive contact portion operative to spin said chuck assembly;
a first tension adjusting device having at least one pneumatic tension adjustment member operative to apply pressure through said first floating track to said first frictional drive belt tangentially to said drive contact portion;
a second frictional drive belt in a second floating track in contact with said drive contact portion and disposed on an opposite side of said chuck assembly to said first frictional drive belt and moving in a direction opposite said first frictional drive belt; and
a second tension adjusting device having at least one pneumatic tension adjustment member operative to apply pressure through said second floating track to said second frictional drive belt tangentially to said drive contact portion;
wherein said first and second pneumatic tension adjustment members each comprise a flexible elastic tube filled with a compressed substance, and wherein said pressure applied by said tube is adjusted by varying the amount of said compressed substance in said tube.

14. The pneumatic tensioner apparatus of claim 13, wherein said first and second floating tracks have a non-stick surface.

15. The pneumatic tensioner apparatus of claim 13, wherein said first and second frictional drive belts are the same continuous belt.

16. The pneumatic tensioner apparatus of claim 13, wherein each of said first and second floating tracks is coupled to a separate support track; and wherein each of said support tracks is coupled to a separate floating bracket.

17. The pneumatic tensioner apparatus of claim 16, wherein each of said first and second frictional drive belts applies pressure to a different one of said separate floating brackets.

* * * * *

UNITED STATES PATENT AND TRADEMARK OFFICE
CERTIFICATE OF CORRECTION

PATENT NO. : 6,957,735 B2
DATED : October 25, 2005
INVENTOR(S) : Russell Varone et al.

It is certified that error appears in the above-identified patent and that said Letters Patent is hereby corrected as shown below:

Title page,
Item [73], Assignee, delete "Graham Packaging, L.P." and insert -- Graham Packaging Company, L.P. --.

Signed and Sealed this

Twenty-seventh Day of December, 2005

JON W. DUDAS
*Director of the United States Patent and Trademark Office*